(12) United States Patent
Chen et al.

(10) Patent No.: US 8,651,541 B2
(45) Date of Patent: Feb. 18, 2014

(54) HOLDING SUPPORT FOR ELECTRONIC DEVICE

(75) Inventors: Ming-Jen Chen, Yunlin County (TW); Kuo-Kuang Liu, Nantou County (TW)

(73) Assignees: Universal Scientific Industrial (Shanghai) Co., Ltd., Shanghai (CN); Universal Global Scientific Industrial Co., Ltd., Nantou County (TW)

( * ) Notice: Subject to any disclaimer, the term of this patent is extended or adjusted under 35 U.S.C. 154(b) by 0 days.

(21) Appl. No.: 13/442,314

(22) Filed: Apr. 9, 2012

(65) Prior Publication Data

US 2013/0043693 A1 Feb. 21, 2013

(30) Foreign Application Priority Data

Aug. 15, 2011 (TW) .............................. 100129113 A (51) Int. Cl.
*B65G 7/12* (2006.01)
*A45C 13/36* (2006.01)

(52) U.S. Cl.
USPC ......... 294/168; 294/25; 206/701; 361/679.01

(58) Field of Classification Search
USPC ........................... 294/165, 168, 25, 166, 167; 361/679.01, 679.02, 683; 206/320, 206/523, 586, 701; D14/341, 440; D3/303, D3/218

See application file for complete search history.

(56) References Cited

U.S. PATENT DOCUMENTS

| | | | | | |
|---|---|---|---|---|---|
| 3,092,244 | A | * | 6/1963 | McWhirter | 206/234 |
| D262,073 | S | * | 12/1981 | Zimmerman | D3/204 |
| 4,775,083 | A | * | 10/1988 | Burger et al. | 224/675 |
| 6,149,001 | A | * | 11/2000 | Akins | 206/320 |
| 6,520,334 | B1 | * | 2/2003 | Hoover | 206/534 |
| 6,646,866 | B2 | * | 11/2003 | Kao | 361/679.26 |
| 6,691,843 | B2 | * | 2/2004 | Nykoluk et al. | 206/586 |
| 7,259,750 | B2 | * | 8/2007 | Ghosh et al. | 345/168 |
| D578,129 | S | * | 10/2008 | Weber | D14/440 |
| D604,045 | S | * | 11/2009 | Schantz et al. | D3/299 |
| 7,639,237 | B2 | * | 12/2009 | Perkins | 345/168 |
| 7,791,874 | B2 | * | 9/2010 | Reents et al. | 361/679.37 |
| D628,469 | S | * | 12/2010 | Taylor et al. | D9/420 |
| D650,774 | S | * | 12/2011 | Molter | D14/239 |
| 2010/0084306 | A1 | * | 4/2010 | Chiang | 206/523 |
| 2010/0195278 | A1 | * | 8/2010 | Wilkenfeld | 361/679.33 |
| 2011/0304960 | A1 | * | 12/2011 | Lu | 361/679.01 |
| 2012/0037536 | A1 | * | 2/2012 | Lonsdale et al. | 206/701 |
| 2012/0188691 | A1 | * | 7/2012 | Zhou | 361/679.01 |

* cited by examiner

*Primary Examiner* — Paul T Chin
(74) *Attorney, Agent, or Firm* — Li & Cai Intellectual Property (USA) Office (57) ABSTRACT

A holding support for electronic device is disclosed, which includes a case and a bracket. A bracket compartment is formed on the case and defined by an opening formed on the outer surface of the case. The bracket has a body and at least one finger hole formed thereon for sliding a finger through. The bracket can be retracted in or extended from the bracket compartment by being arranged at a retracted position or extended position, respectively. Therefore, the user can firmly secure the electronic device and prevent from dropping it accidentally.

5 Claims, 8 Drawing Sheets

HOLDING SUPPORT FOR ELECTRONIC DEVICE

BACKGROUND OF THE INVENTION

1. Field of the Invention

The instant disclosure relates to a holding support for electronic device; more particularly, to a holding support for using with an electronic device, where the electronic device is held in one hand and operated by another hand of the user.

2. Description of Related Art

With the advancement in technology, the electronic devices today, such as tablet computers, are designed to take up as little space as possible and to be lightweight. When using the electronic device, the electronic device is typically being held in the palm of a person's hand, while the other hand is used to operate the touch screen. This is how a single hand held electronic device is typically being used.

However, most electronic devices do not have a holding portion specifically designed to ensure firm grip by the user. This negligence increases the risk of dropping the electronic device or allowing it to slip out when the person is lightly bumped. To address this issue, the conventional means include adding an external strap or a hand support onto the housing of the electronic device. However, both the strap and the hand support are not easy to conceal, besides taking up additional space.

To address the above issues, the inventors strive via industrial experience and academic research to present the instant disclosure, which can effectively improve the limitations described above.

SUMMARY OF THE INVENTION

The instant disclosure provides a holding support for electronic device, to further secure the electronic device and prevent it from being dropped accidentally by the user.

The holding support for electronic device of the instant disclosure comprises: a case having a bracket compartment formed thereon, where the bracket compartment is defined by an opening formed on the outer surface of the case; and a bracket that can be received in or drawn from the bracket compartment. The bracket has a body and at least one finger hole formed thereon for sliding a person's finger therethrough.

For advantages, when using the electronic device, the user can pull out and use the bracket to hold the electronic device firmly in the palm of his/her hand. When the electronic device is not being used, the bracket can be retracted into the case to save space.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTIONS OF PREFERRED EMBODIMENT

Please refer to FIGS. 1~4. The instant disclosure provides a holding support for electronic device, which comprises a case 10 and a bracket 20. The electronic device may be a tablet computer, POS (Point of sale), PDA (personal digital assistant), or any other device without restriction.

Figure 7:
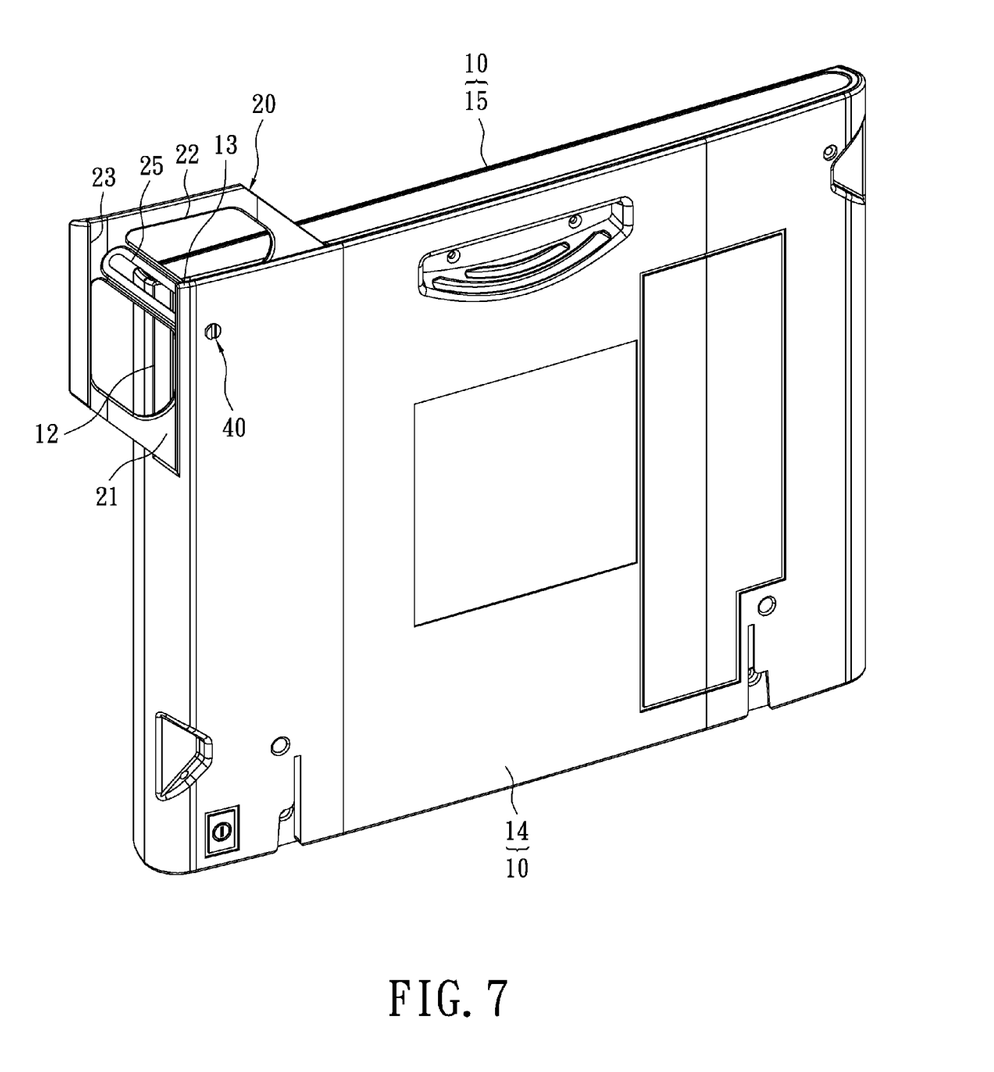
FIG. 7 is another perspective view of the assembled holding support for electronic device of the instant disclosure taken from a different angle, with the bracket arranged at the extended position.
Figure 8:
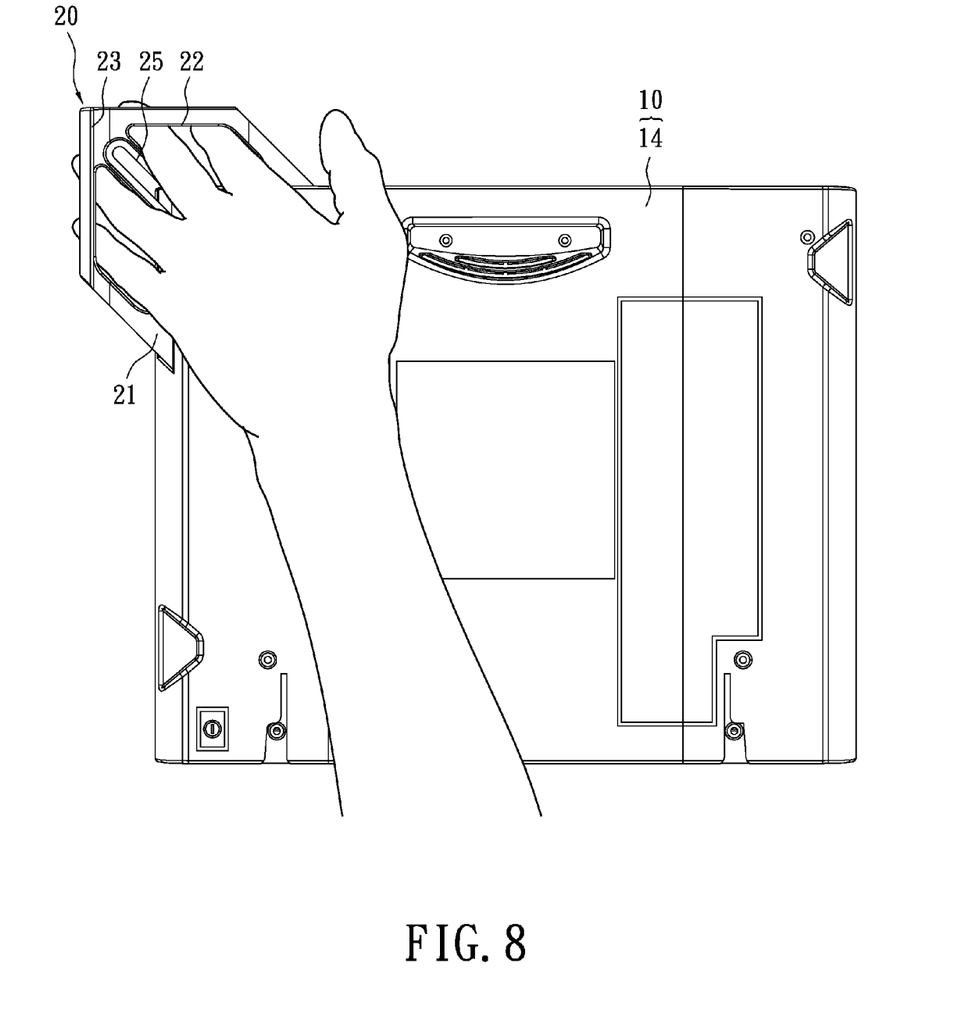
FIG. 8 is a schematic view of using the holding support for electronic device of the instant disclosure, with the fingers of the user's left hand slid through the finger holes of the bracket.

A bracket compartment 11 is formed internally of the case 10, where the bracket compartment 11 is defined by an opening 12 formed on the outer surface of the case 10 (as shown in FIG. 7). For the present embodiment, the bracket compartment 11 and the opening 12 are both arranged in the vicinity of upper right corner and toward the rear portion of the case 10. However, the arranged location is not restricted.

Figure 2:
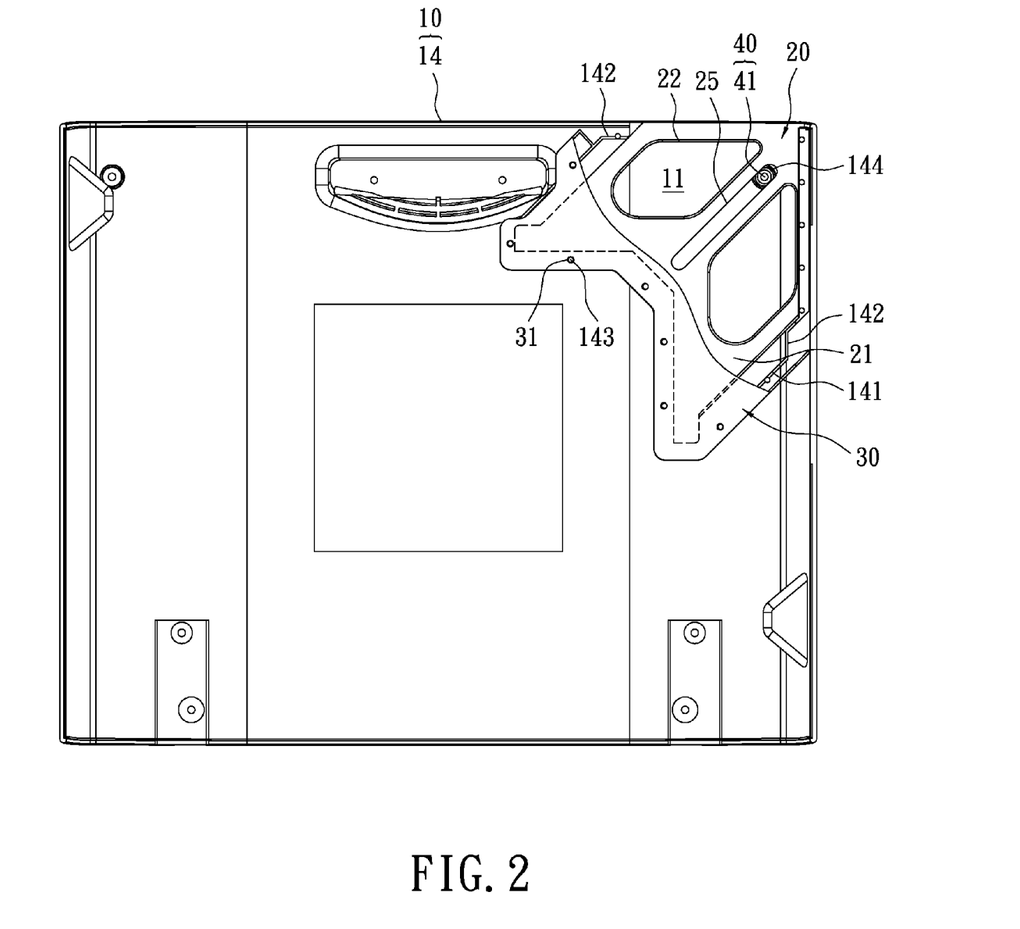
FIG. 2 is a front view of the assembled holding support for electronic device of the instant disclosure, where a second cover is not shown and with a bracket arranged at a retracted position.
Figure 3:
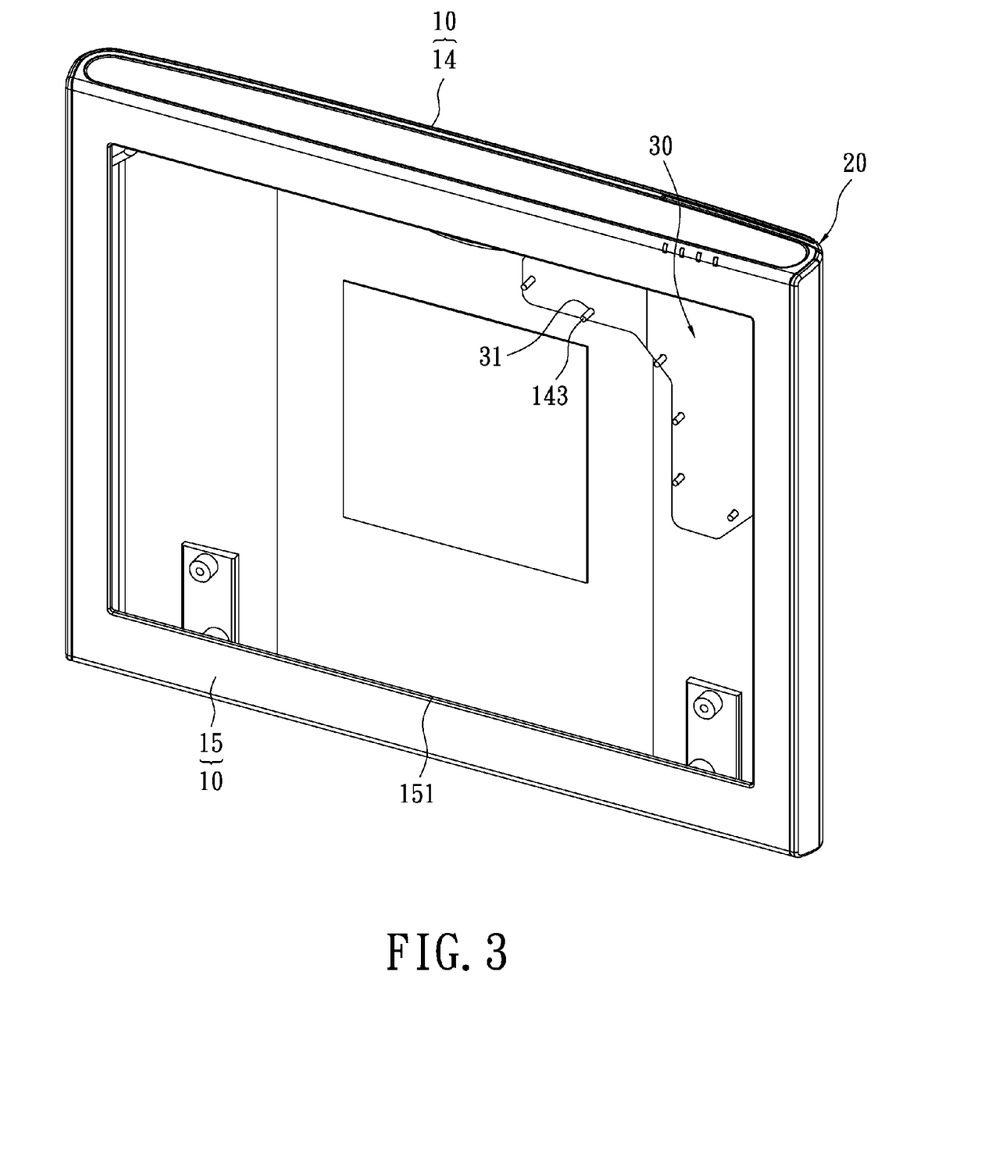
FIG. 3 is a perspective view of the assembled holding support for electronic device of the instant disclosure.
Figure 6:
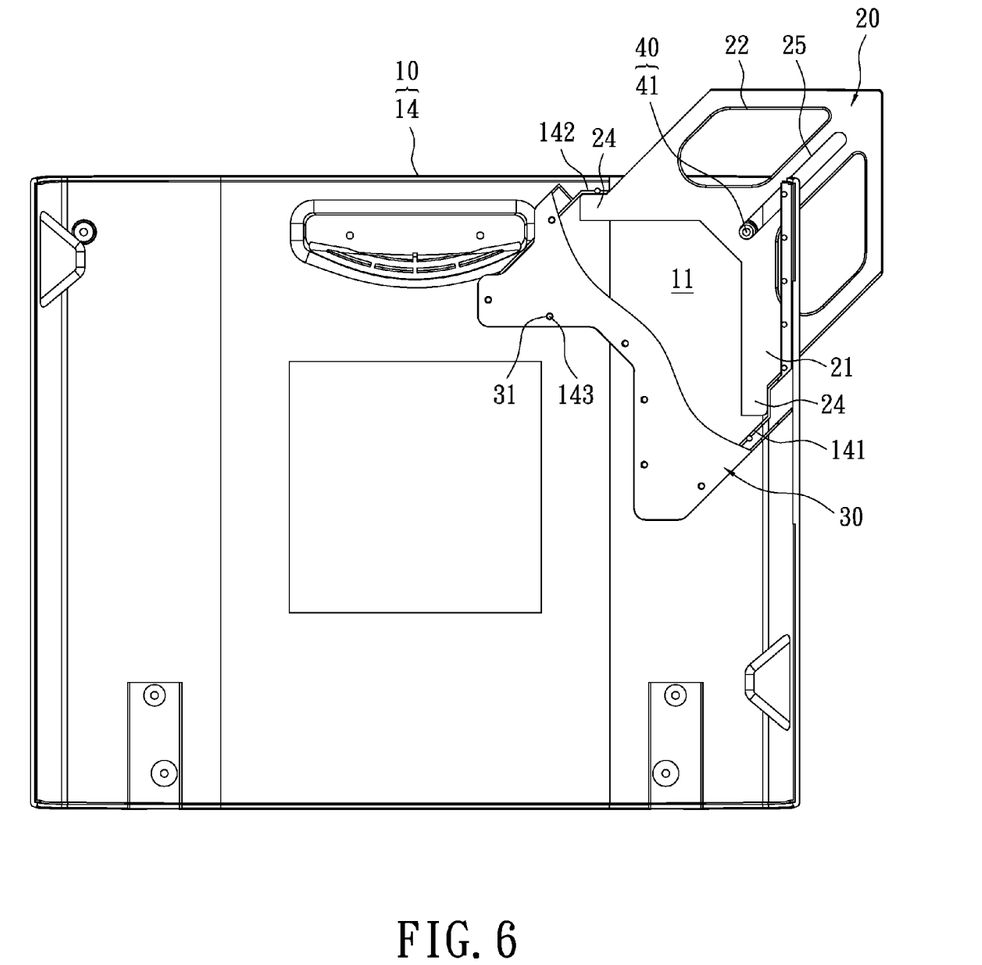
FIG. 6 is a front view of the assembled holding support for electronic device of the instant disclosure, where the second cover is not shown and the bracket is arranged at an extended position.

The bracket 20 can be extendably received in the bracket compartment 11 of the case 10. Namely, the bracket 20 can be at a retracted position by being received in the bracket compartment 11 (as shown in FIG. 2) or at an extended position by protruding from the bracket compartment 11 (as shown in FIG. 6). The bracket 20 has a body 21 and at least one finger hole 22 formed thereon for sliding a finger through. The shape and number of the finger hole 22 are not restricted. For the present embodiment, two finger holes 22 are formed symmetrically on the body 21. The bracket 20 having only one finger hole 22 formed thereon is also allowable. The holding support for electronic device of the instant disclosure comprises the aforementioned technical features.

Figure 4:
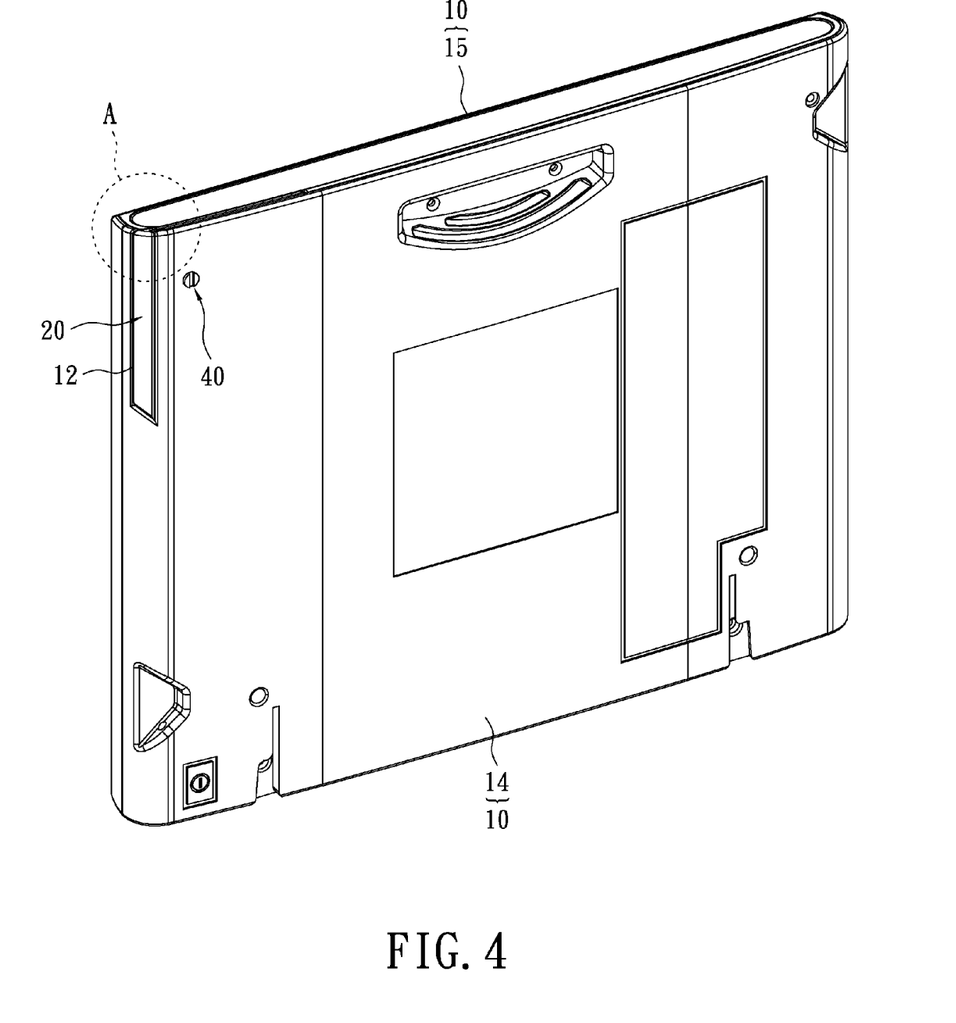
FIG. 4 is another perspective view of the assembled holding support for electronic device of the instant disclosure taken from a different angle, with the bracket arranged at the retracted position.
Figure 5:
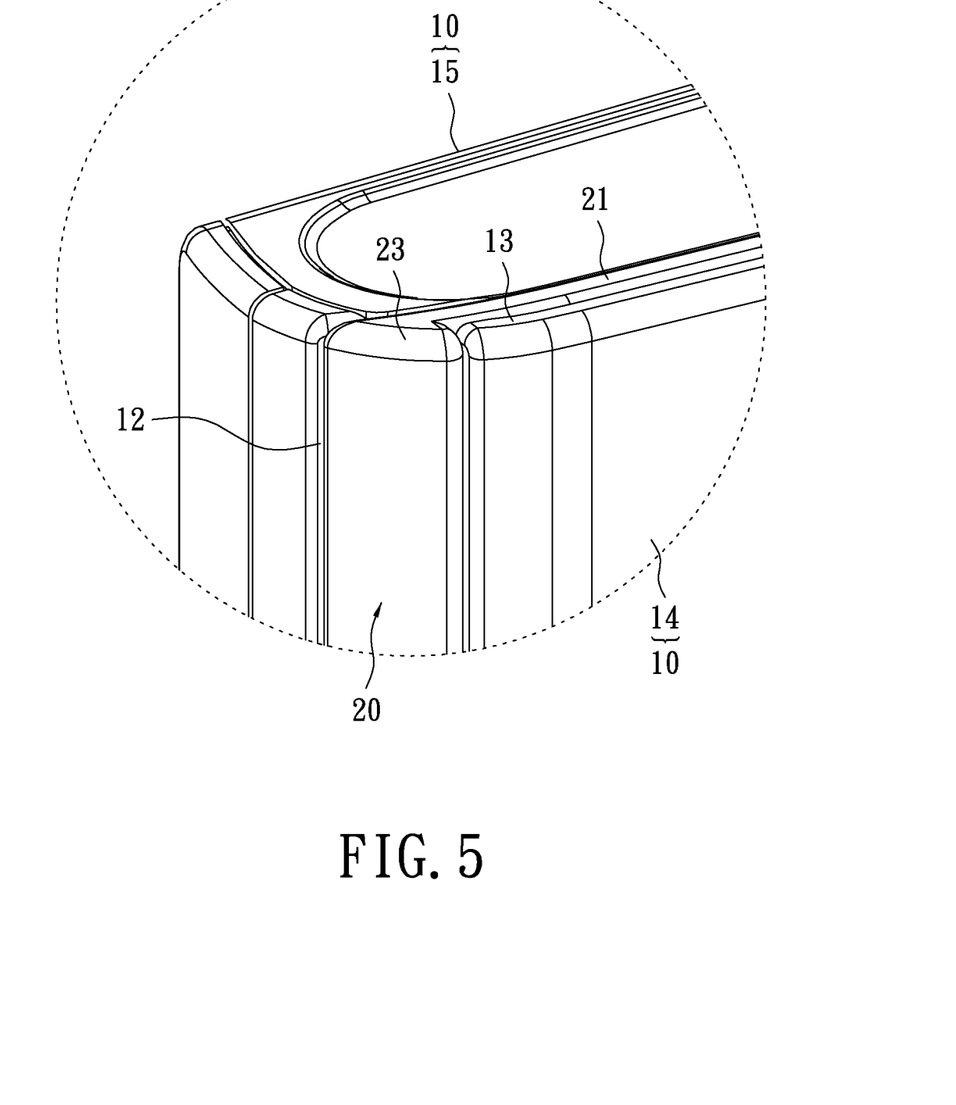
FIG. 5 is an enlarged view of portion A in FIG. 4.

Please also refer to FIGS. 4 and 5. A pulling portion 23 is formed protruding outwardly on one side of the body 21 of the bracket 20. The pulling portion 23 is arranged exposingly at the opening 12. A stopping portion 13 is formed on the case 10 and adjacent to the opening 12. When the bracket 20 is at the retracted position, the pulling portion 23 is abutted to the stopper 13.

Please refer back to FIGS. 1 and 2. The case 10 includes a first cover 14 and a second cover 15. The first and second covers 14 and 15 can be paired to form a unit. A plate 30 is arranged close to the inner surface of the first cover 14 in defining the bracket compartment 11. For the instant embodiment, the case 10 is the housing of a tablet computer. The first cover 14 and the second cover 15 are the rear cover and front cover of the housing, respectively. The front cover has a window 151 for showing the liquid crystal display (not shown) of the tablet computer.

Furthermore, at least one abutting portion 24 can be selectively formed on the bracket 20. For the present embodiment, two abutting portions 24 are formed symmetrically on the body 21 in a protruding manner. A ridge 141 is formed surroundingly on the inner surface of the first cover 14. Two stoppers 142 are formed on respective ends of the ridge 141 in correspondence to the abutting portions 24. When the bracket 20 is at the extended position, each of the abutting portions 24 is abutted by the corresponding stopper 142. The abutment ensures the bracket 20 and the case 10 are arranged correctly with respect to each other and reduces the looseness therebetween.

Moreover, a plurality pillars 143 is spaced on the ridge 141 protrudingly toward the plate 30. A plurality of set holes 31 is formed correspondingly on the plate 30. When mounting the plate 30, the plate 30 is arranged against the ridge 141 with the pillars 143 projecting through the corresponding set holes 31.

Alternatively, the pillars 143 may be formed on the inner surface of the second cover 15 for mounting the plate 30 thereon instead.

Further still, the plate 30 may be designed in such a way to have barbed structures for latching to the second cover 15. The interconnecting method between the plate 30 and the second cover 15 is not restricted.

Figure 1:
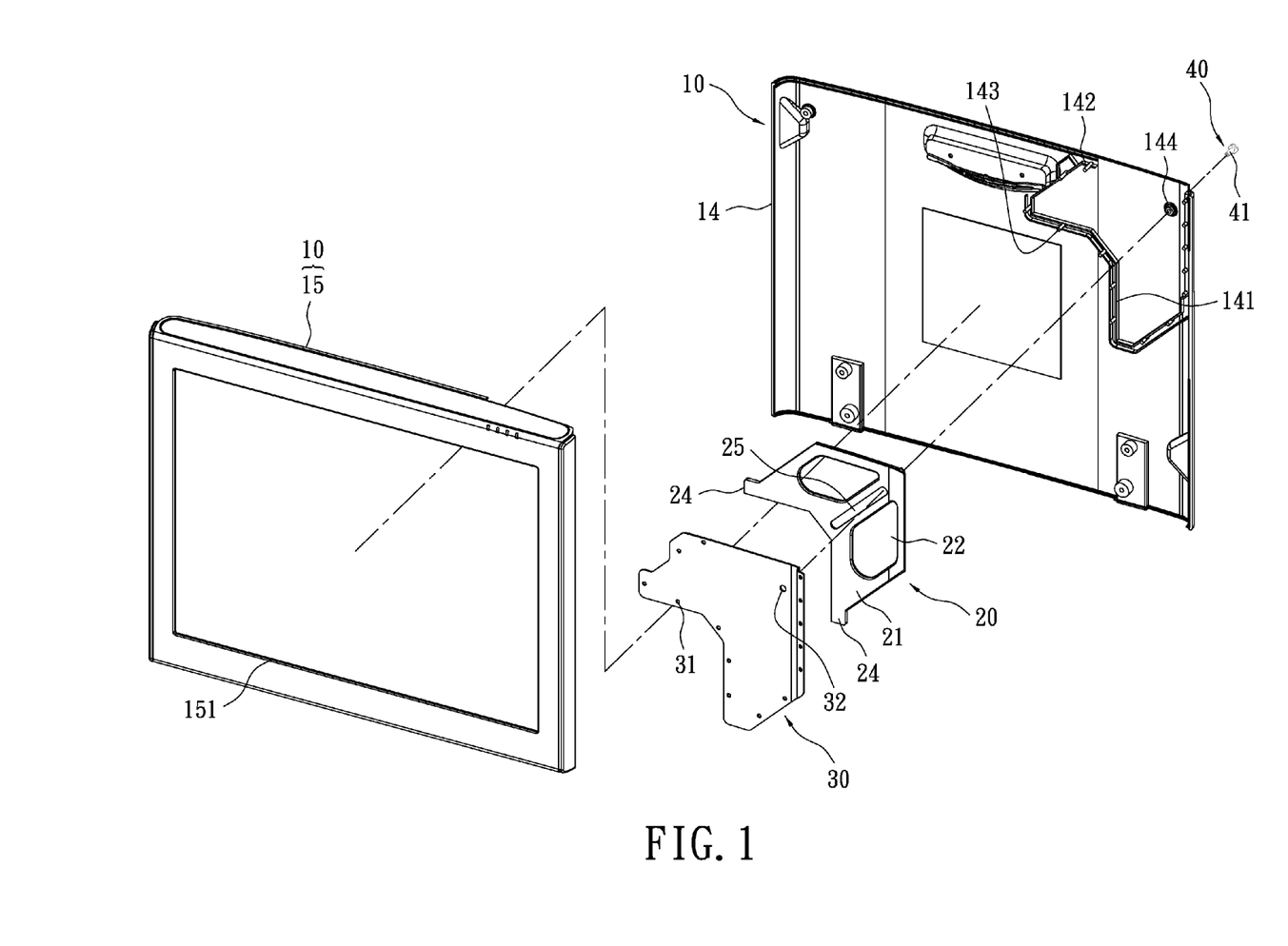
FIG. 1 is an exploded view of a holding support for electronic device of the instant disclosure.

Please refer to FIGS. 1, 2, and 6. The holding support for electronic device of the instant disclosure further includes a fastening element 40. The fastening element 40 has a shaft 41, while an inserting hole 144 is formed on the first cover 14. A thru-slot 25 is formed on the body 21 for guiding the bracket 20 to move between the retracted and extended positions. The two finger holes 22 are arranged on opposite sides of the thru-slot 25. A threaded hole 32 is formed on the plate 30 and aligned to the inserting hole 144. The shaft 41 of the fastening element 40 is projected through the inserting hole 144 and the thru-slot 25 before driven into the threaded hole 32 of the plate 30. The shaft 41 and the thru-slot 25 allow the bracket 20 capable of being moved in a guided direction with ease and steadiness.

Please refer to FIGS. 2 and 4. When the holding support of the instant disclosure is not being used, the bracket 20 can be pushed into the case 10 and received in the bracket compartment 11. In other words, the bracket 20 can be arranged at the retracted position to not occupying any external space.

When the holding support of the instant disclosure is to be used, as shown in FIGS. 6 and 7, the bracket 20 can be drawn from the bracket compartment 11 of the case 10 and be exposed protrudingly. In other words, the bracket 20 can be arranged at the extended position to expose the finger holes 22. Thus, the case 10 can be held in the palm of a person's hand or supported by one's arm, while the fingers can slide through the finger holes 22 from the bottom side of the body 21 and exited from the top side thereof. The case 10 can thus be firmly secured and prevent from being dropped accidentally by the user. Moreover, the pulling portion 23 is designed to be easily accessible by the user, such that the bracket 20 can be easily drawn from the case 10.

Based on the above, when a person needs to use his/her electronic device, the user can pull out the bracket of the holding support, to allow the electronic device to be held firmly by the user. Whereas if the electronic device is not to be used, the bracket can be retracted into the case for concealment and space saving.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A holding support for electronic device, comprising:
    a case including a jointly assembled first cover and second cover, and a plate member disposed adjacently to an inner surface of the first cover to cooperatively define a bracket compartment accessible from the exterior thereof through an opening defined on a side of the case; and
    a bracket extendably arranged in the bracket compartment selectively retainable in a retracted and an extended position, the bracket having a main body with at least one finger hole formed thereon for sliding a human finger there-through,
    wherein the bracket includes at least one abutting portion extendedly arranged thereon and received in the bracket compartment,
    wherein the inner surface of the first cover has a ridge formed surroundingly thereon,
    wherein the ridge has a stopper formed thereon arranged in correspondence to the abutting portion such that when the bracket is in the extended position, the abutting portion abuts the stopper.

2. The holding support for electronic device of claim 1, wherein the slot bracket compartment and the opening are formed at a corner portion of the case.

3. The holding support for electronic device of claim 1, wherein a pulling portion is formed protrudingly on the edge portion of the main body, wherein the pulling portion is arranged exposingly at the opening while the bracket is received in the slot bracket compartment, wherein a stopping portion is formed on the case adjacent to the opening, and wherein when the bracket is in the retracted position, the pulling portion is abutted by the stopping portion.

4. The holding support for electronic device of claim 1, wherein a plurality of fixing posts is spaced on the ridge, wherein a plurality of set holes are formed on the plate member, and wherein the plate member is arranged against the ridge with the fixing posts projected through the corresponding set holes.

5. The holding support for electronic device of claim 1, further comprises a fastening element having a shaft portion, wherein an inserting hole is formed on the first cover and a thru-slot is formed on the main body of the bracket, wherein a threaded hole is formed on the plate member in alignment with the inserting hole, and wherein the shaft portion of the fastening element is projected through the inserting hole and the set hole before driven into the threaded hole.

* * * * *